United States Patent
Chen et al.

(10) Patent No.: US 7,139,575 B1
(45) Date of Patent: Nov. 21, 2006

(54) TRIGGER FOR HARD HANDOFF FROM AN OVERLAY CARRIER TO AN UNDERLYING CARRIER

(75) Inventors: Xixian Chen, Ottawa (CA); Neil McGowan, Stittsville (CA); Weigang Li, Ottawa (CA); James R. Weisert, Calgary (CA); Sabeena Abdulmajeed, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 158 days.

(21) Appl. No.: 11/020,235

(22) Filed: Dec. 27, 2004

Related U.S. Application Data

(60) Provisional application No. 60/558,525, filed on Apr. 1, 2004.

(51) Int. Cl.
*H04Q 7/20* (2006.01)
(52) U.S. Cl. ............ 455/437; 455/439; 455/436; 455/438; 370/332; 370/331
(58) Field of Classification Search ............ 455/437, 455/439, 436, 438; 370/332, 331
See application file for complete search history.

(56) References Cited

U.S. PATENT DOCUMENTS

| | | | |
|---|---|---|---|
| 5,170,485 A * | 12/1992 | Levine et al. ............ | 455/437 |
| 6,026,301 A | 2/2000 | Satarasinghe | |
| 6,321,089 B1 * | 11/2001 | Han ............ | 455/438 |
| 6,532,221 B1 * | 3/2003 | Kim et al. ............ | 370/332 |
| 6,754,493 B1 * | 6/2004 | Jetzek ............ | 455/436 |
| 6,771,265 B1 * | 8/2004 | Shimono ............ | 345/426 |
| 6,813,495 B1 * | 11/2004 | Sasaki et al. ............ | 455/442 |
| 6,826,161 B1 * | 11/2004 | Shahidi et al. ............ | 370/331 |
| 2002/0107021 A1 * | 8/2002 | Ishikawa et al. ............ | 455/436 |

OTHER PUBLICATIONS

Tcha, Dong-Wan, Jin, Go-Whan and Paik, Chun-Hyun, Handoff Management without Intercell Hard Handoff in a Multifrequency CDMA System, IEEE Transactions on Vehicular Technology, vol. 52, No. 2, Mar. 2003.
Tung, Thanh Pham and Perkis, Andrew, An Introduction to Radio Resource Management in Cellular Systems; retrieved from www.item.ntnu.no/nfli/cac_tung.pdf.
Garg, Vijay, Soft Handoff and Power Control in IS-95 CDMA; Chapter 10, IS-95 CDMA and CDMA2000: Cellular/PCS Systems Implementation; Dec. 1999.

\* cited by examiner

*Primary Examiner*—Danh Cong Le

(57) ABSTRACT

Initiation of a hard handoff at a mobile station from an overlay carrier to an underlying carrier in a wireless telecommunications system may be considered based on a first condition being satisfied. Once the first condition is satisfied, hard handoff may be initiated based on at least one of a plurality of further conditions being satisfied. Advantageously, the plurality of further conditions may be arranged to be independent of the total power received at the mobile station and, therefore, independent of loading.

21 Claims, 13 Drawing Sheets

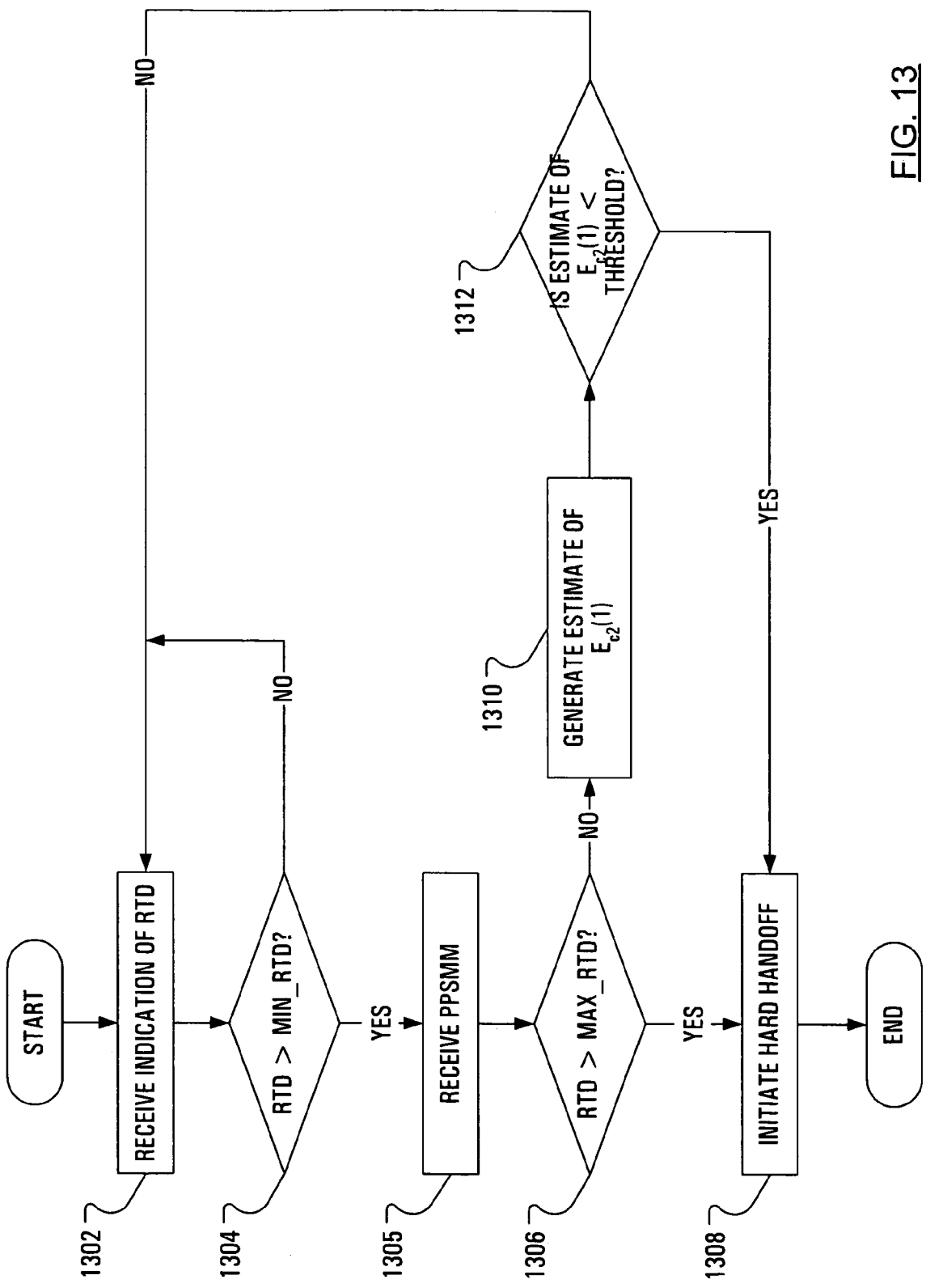

TRIGGER FOR HARD HANDOFF FROM AN OVERLAY CARRIER TO AN UNDERLYING CARRIER

CROSS REFERENCE TO RELATED APPLICATIONS

The present application claims the benefit of prior provisional application Ser. No. 60/558,525, filed Apr. 1, 2004, which is hereby incorporated herein by reference.

FIELD OF THE INVENTION

The present invention relates to hard handoff from an overlay carrier to an underlying carrier in wireless cellular communications systems and, in particular, to methods and apparatus for determining a trigger for such a hard handoff.

BACKGROUND

In wireless cellular communications systems, one or more base stations that are connected to one or more communications networks support communication of a mobile station with the one or more communications networks by way of a wireless communication channel between the mobile station and the base station.

In an effort to improve spectral efficiency in such wireless cellular communications systems, a digital wireless transmission method called Code Division Multiple Access (CDMA) may be employed. In CDMA, signals for transmission are encoded using one of several pseudo-random sequences that the receiver also knows and can use to decode a received signal. Each of the pseudo-random sequences corresponds to one of several different communication channels.

In further efforts to improve spectral efficiency, an architecture has been devised in which a given base station, while cooperating with several other base stations to supply carriers that define a first coverage area, supplies a carrier to define a second coverage area underlying the first coverage area. A wireless communication channel between a mobile station and the given base station using a frequency associated with the second coverage area may be called an underlying carrier. Additionally, the wireless communication channel between a mobile station and one or more base stations (including the given base station) using a frequency associated with the first coverage area may be called an overlay carrier.

Handoff is a mechanism in wireless cellular communications systems that provides for the transfer of an ongoing call from a first wireless communication channel to a second wireless communication channel. The first wireless communication channel and the second wireless communication channel may, on one hand, both be associated with one broad coverage area or, on another hand, first wireless communication channel may be associated with an overlaying coverage area (with associated overlay carriers) and the second wireless communication channel may be associated with an underlying coverage area (with associated underlying carriers). Each handoff may require network resources to route the call from the base stations supporting the first wireless communication channel to the base stations supporting the second wireless communication channel. In some instances, the same base station supports both wireless communication channels.

"Hard handoff" is a term used in CDMA systems to describe a handoff in several instances. For example, a handoff involving a change from a wireless communication channel using one frequency to wireless communication channel using another frequency may be called a hard handoff. Additionally, a handoff involving a system change, e.g., from a wireless communication channel with the base stations supplied by one manufacturer to a wireless communication channel with the base stations supplied by another manufacturer, may be called a hard handoff. Further, a hard handoff may involve a handoff from a wireless communication channel with the base stations controlled by one base station controller to a wireless communication channel with the base stations controlled by another base station controller.

In a hard handoff, the existing wireless communication channel between the mobile station and the initial base stations is broken before a new wireless communication channel between the mobile station and the final base stations is established. Such a hard handoff is generally used where the wireless communication channel between the mobile station and the initial base stations and the wireless communication channel between the mobile station and the final base stations do not use the same radio frequency channel. Notably, where the hard handoff is from an overlay carrier to an underlying carrier, the initial and final base stations may be the same base stations.

A hard handoff contrasts with a soft handoff, which is generally used when the existing wireless communication channel between the mobile station and the first base station uses the same radio frequency channel as wireless communication channel between the mobile station and the second base station. In a soft handoff, the existing wireless communication channel between the mobile station and the first base station is maintained while a new wireless communication channel between the mobile station and the second base station is established.

A hard handoff may be network-controlled or mobile-controlled handoff and is typically triggered through the recognition that a measured round trip delay (RTD) has exceeded a threshold. RTD is a measure of the time taken for an electronic message to travel from the base station to the mobile station and back to the base station.

However, using RTD to trigger hard handoffs results in an effective coverage area that is circular in shape for a carrier supplied by an omnidirectional antenna at a given base station (i.e., an "omni" base station as distinct from a "sectored" base station with directional antennas). Notably, this circular effective coverage area may be much smaller that the effective coverage area would be if defined according to alternative metrics. The overlay carriers provided by a given omni base station may be considered to have significant unused capacity beyond that in use within the circular effective coverage area. Clearly, an improved trigger for hard handoff is required to use more of the capacity of the overlay carriers.

SUMMARY

By using alternative metrics to the metrics currently in use for triggering hard handoff at a mobile station from an overlay carrier to an underlying carrier, the effective coverage area of a given omni base station may be expanded beyond the circular effective coverage area defined by the currently-employed round trip delay metric. Initiation of the hard handoff may be considered based on a first condition being satisfied. Once the first condition is satisfied, hard handoff may be initiated based on at least one of a plurality of further conditions being satisfied. Advantageously, use of alternative metrics for triggering hard handoff may lead to more complete use of the capacity of overlay carriers.

In accordance with another aspect of the present invention there is provided a method of initiating a hard handoff at a mobile station from an overlay carrier to an underlying carrier in a wireless telecommunications system. The method includes determining whether a first condition has been satisfied, if the first condition has been satisfied, determining whether at least one of a plurality of further conditions has been satisfied and initiating the hard handoff if the at least one of the plurality of further conditions has been satisfied.

In accordance with another aspect of the present invention there is provided a method of initiating a hard handoff at a mobile station from an overlay carrier to an underlying carrier in a wireless telecommunications system. The method including receiving an indication of a value of a primary metric, receiving indications of values for a plurality of secondary metrics, comparing the value of the primary metric to a predetermined primary threshold, if the value of the primary metric exceeds the predetermined primary threshold, determining an estimate for a value of a tertiary metric, based on the values for the plurality of secondary metrics, comparing the estimate for the value of the tertiary metric to a predetermined tertiary threshold and initiating the hard handoff at the mobile station if the estimate for the value of the tertiary metric is less than the tertiary threshold. In other aspects of the present invention, a base station controller is provided for carrying out this method.

In accordance with another aspect of the present invention there is provided a method of initiating a hard handoff at a mobile station from an overlay carrier to an underlying carrier in a wireless telecommunications system. The method includes receiving an indication of a value of a primary metric, receiving an indication of a value of a secondary metric, receiving an indication of a value of a tertiary metric and comparing the value of the primary metric to a predetermined primary threshold. If the value of the primary metric exceeds the predetermined primary threshold, the method further includes comparing the value of the secondary metric to a predetermined secondary threshold and comparing the value of the tertiary metric to a predetermined tertiary threshold. The method further includes initiating the hard handoff at the mobile station if: the value of the secondary metric exceeds the secondary threshold; and the value of the tertiary metric exceeds the tertiary threshold.

Although the illustrated example embodiments of aspects of this invention described in the next sections use omni base stations, aspects of the present invention can also be used for known "sectored" base station configurations.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 13 illustrates steps in a further alternative method executed to determine whether to initiate, at a mobile station, a hard handoff from an overlay carrier to an underlying carrier according to an embodiment of the present invention.

DETAILED DESCRIPTION

Figure 1:
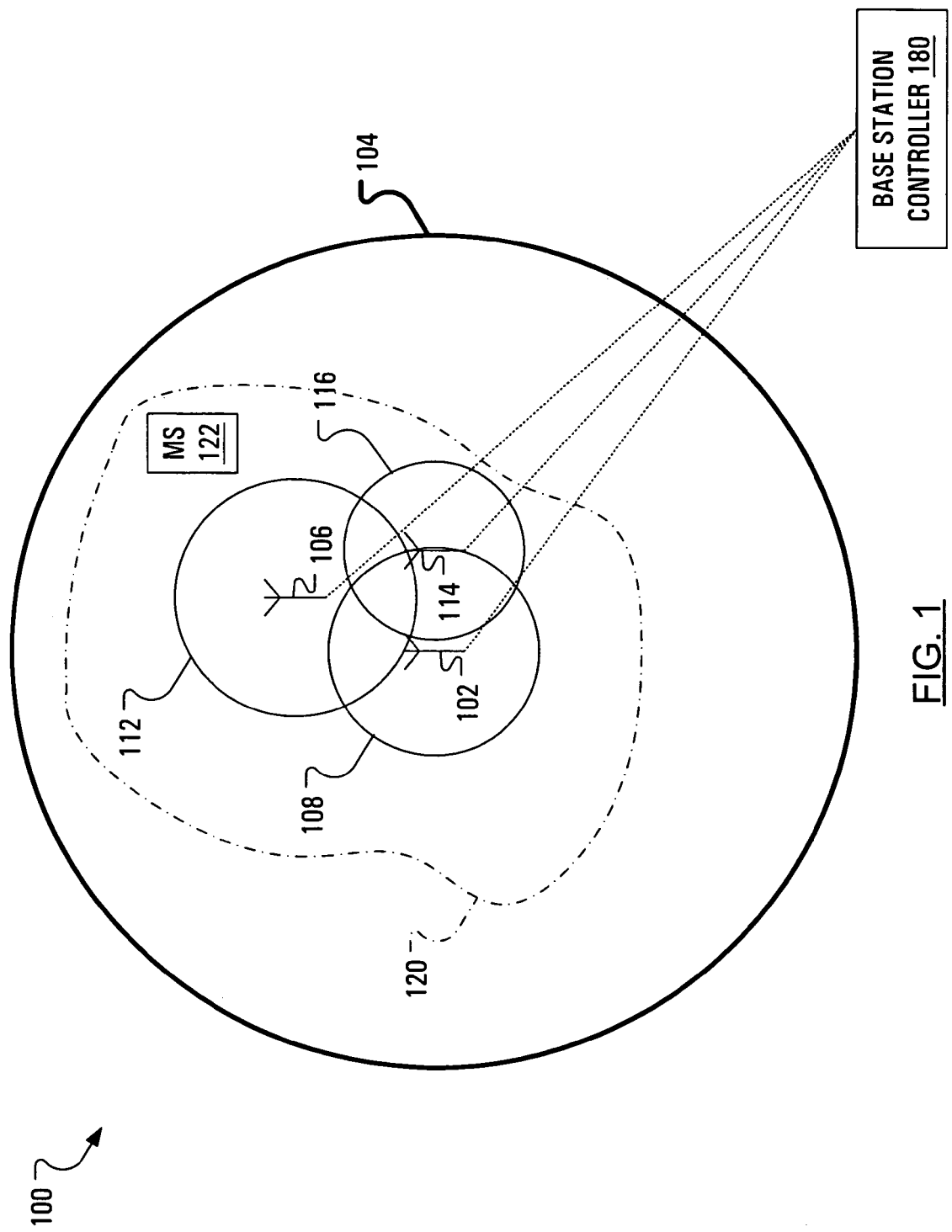
FIG. 1 illustrates thresholds of effective coverage in an exemplary wireless cellular communications system.

FIG. 1 illustrates effective coverage in an exemplary wireless cellular communications system 100. The exemplary wireless cellular communications system 100 includes a first base station 102, a second base station 106 and a third base station 114 along with several other base stations that are not illustrated. As is typical, all base stations in the exemplary wireless cellular communications system 100 provide the underlying carriers. It is known to provide, often when a wireless cellular communications system is operating in an area of high population density, the overlay carriers.

The underlying carriers may define an effective underlying coverage area bounded by an underlying service boundary 104. Additionally, the overlay carriers, as provided by the first base station 102, may define a first overlay coverage area bounded by a first effective overlay carrier boundary 108 according to RTD measurements. Similarly, the overlay carriers, as provided by the second base station 106, may define a second effective overlay coverage area bounded by a second effective overlay boundary 112 according to RTD measurements and the overlay carriers, as provided by the third base station 114, may define a third overlay coverage area bounded by a third overlay boundary 116 according to RTD measurements. A mobile station (MS) 122 is also illustrated.

Additionally, a base station controller 180 is provided to provide control to each of the base stations 102, 106, 114 in the exemplary wireless cellular communications system 100 as well as the other base stations. The base station controller 180 may connect to the base stations 102, 106, 114 via a direct wired link, a wireless microwave link, etc.

By defining the effective coverage area provided by the overlay carriers by an alternative metric, the effective coverage area of the overlay carriers provided by the base stations 102, 106, 114 may be bounded by an effective overlay boundary 120. The area inside the effective overlay boundary 120 and outside the first effective overlay boundary 108, the second overlay boundary 112 and the third overlay boundary 116 represents unused capacity of the overlay carriers and, perhaps, an unnecessary burden on the capacity of the underlying carriers provided by all of the base stations.

Figure 2:
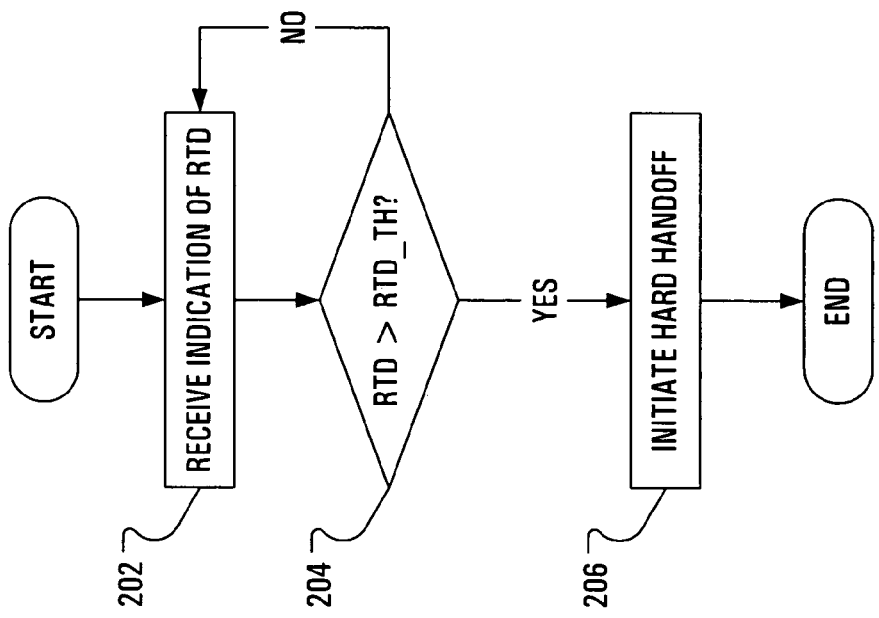
FIG. 2 illustrates steps in a known method executed to determine whether to initiate, at a mobile station, a hard handoff from an overlay carrier to an underlying carrier.

It is known that the second base station 106 may determine a round trip delay time (an RTD) of a message to the mobile station 122 and associate the RTD with the mobile station 122 in a report to the base station controller 180. The base station controller 180 may then carry out the steps of the known method of FIG. 2 to determine whether to initiate, at the mobile station 122, a hard handoff from an overlay carrier to an underlying carrier.

Initially, the base station controller 180 may receive an indication of the RTD from the second base station 106 (step 202). The base station controller 180 may then compare the received RTD to a threshold (RTD_TH) (step 204). If it is determined that the received RTD is less than the threshold, no further actions are required and the base station controller 180 may await the receipt of a subsequently measured RTD (step 202). If it is determined that the received RTD exceeds the threshold, the base station controller 180 may initiate a hard handoff (step 206) at the mobile station 122 from the overlay carrier to the underlying carrier.

It is known for a given base station in CDMA systems to transmit a signal on a pilot channel, where a pilot channel is a base-to-mobile forward-link channel that is modulated only by the pseudo-random sequences common to signals transmitted from the given base station.

Each mobile station maintains an active set of N base stations. A given mobile station may monitor the pilot channel from each of the base stations in the active set. The given mobile station may select, as a "reference" base station, the base station from which a pilot channel is first received.

The power of the signal received on a pilot channel from each of the base stations in the active set may be measured and recorded at a mobile station. An indication of the measured power may be periodically transmitted to all of the base stations in the active set in a pilot strength measurement message (PSMM). The PSMM contains information about each of the N pilot signals received by the mobile station, including an indication, for each pilot channel, of a ratio, $$P(k) = \frac{E_c(k)}{I_o},$$

of the pilot channel power, $E_c(k)$, from the $k^{th}$ base station measured at the mobile station to the total power, $I_o$, received by the mobile station. All the base stations in the active set may transmit received PSMM information to the base station controller 180. Note that, in some text books, $E_c$ is used to indicate the energy per chip and $I_o$ is used to indicate the power per Hz. Since $E_c/I_o$ is equivalent to received pilot channel power over total received power, to simplify the description, $E_c$ is used in the following to indicate the received pilot channel power and $I_o$ to indicate the total power received by the mobile station.

Although the indication of P(1), which is the indication of P(k) for the reference base station, may be considered a candidate metric for triggering hard handoff, it has been found that the total power ($I_o$) received by the mobile station at the hard handoff trigger point is dependent on loading of the base stations. Consequently, since P(1) includes $I_o$, if the indication of P(1) is used as the metric for triggering hard handoff, triggering of hard handoff may be seen to be sensitive to loading.

It is proposed herein to trigger hard handoff at a given mobile station based on one of two conditions being satisfied. In one embodiment, to satisfy the first condition, a maximum RTD is exceeded and to satisfy the second condition, an estimate of a ratio of received reference pilot channel power to interference power is exceeded by a minimum ratio of received reference pilot channel power to interference power, where the interference power, including the thermal noise power plus the signal power, originates at the base stations that are not in the active set of base stations for the given mobile station. Additionally, a minimum RTD may be defined to reduce unnecessary testing of the conditions.

Advantageously, the use of an estimate of a ratio of the received reference pilot channel power to interference power does not involve the total power ($I_o$) received by the mobile station and thereby eliminates dependence on the loading of the base stations.

Figure 3:
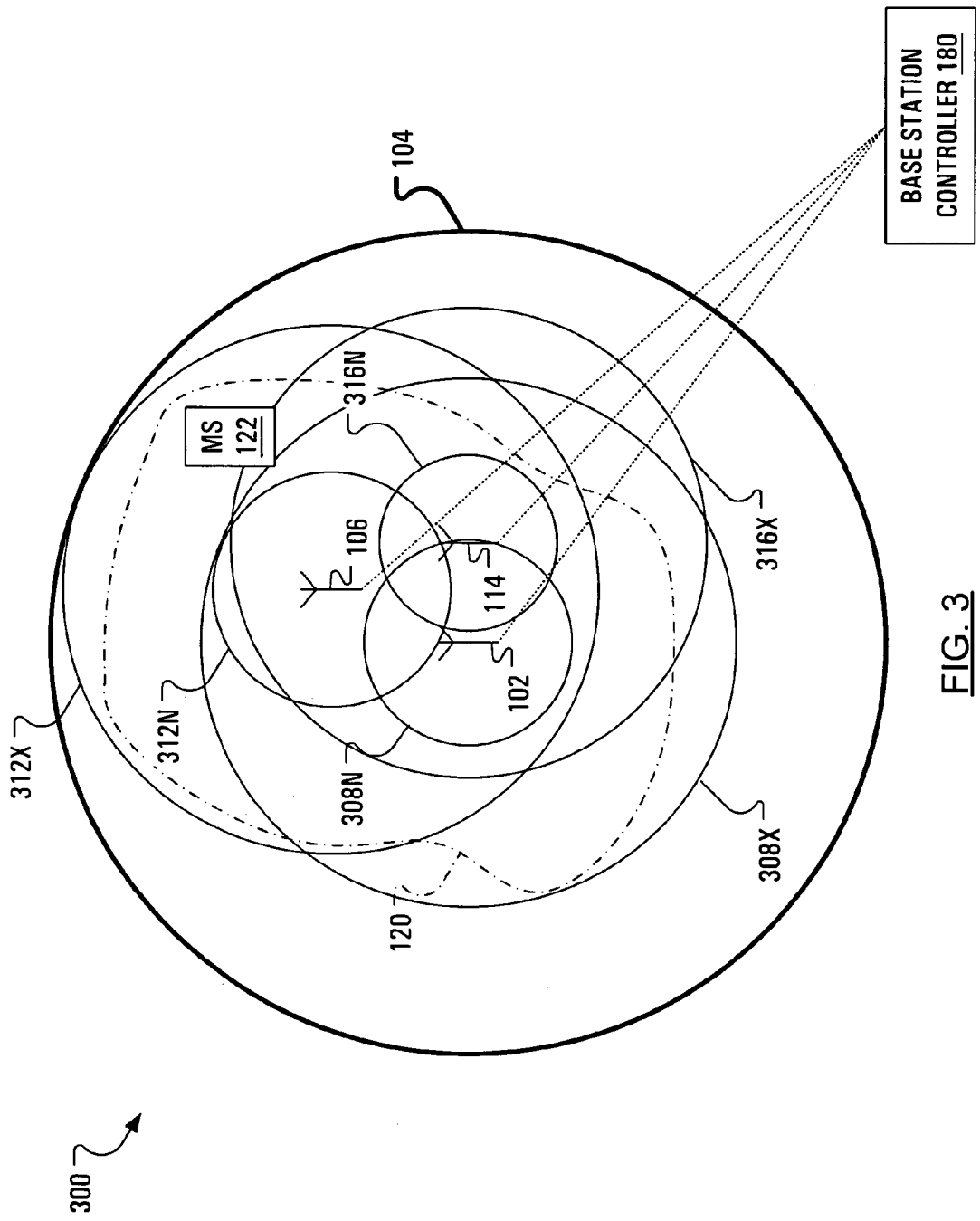
FIG. 3 illustrates thresholds of effective coverage in an adapted wireless cellular communications system.

Graphically, the thresholds are represented in an adapted wireless cellular communications system 300 in FIG. 3. The adapted wireless cellular communications system 300 includes the base stations 102, 106, 114 familiar from the exemplary wireless cellular communications system 100 of FIG. 1. The underlying coverage area defined by the underlying carriers from all of the base stations continues to be bounded by the underlying boundary 104.

However, the overlay carriers, as supplied by the first base station 102, now define a first minimum overlay coverage area bounded by a first minimum overlay boundary 308N according to comparisons of RTD measurements to a minimum RTD threshold MIN_RTD. The overlay carriers, as supplied by the first base station 102, also now define a first maximum overlay coverage area bounded by a first maximum overlay boundary 308X according to comparisons of RTD measurements to a first maximum RTD threshold, MAX_RTD.

Additionally, the overlay carriers, as supplied by the second base station 106, now define a second minimum overlay coverage area bounded by a second minimum overlay boundary 312N according to comparisons of RTD measurements to MIN_RTD. The overlay carriers, as supplied by the second base station 106, also now define a second maximum overlay coverage area bounded by a second maximum overlay boundary 312X according to comparisons of RTD measurements to MAX_RTD.

Similarly, the overlay carriers, as supplied by the third base station 114, now define a third minimum overlay coverage area bounded by a third minimum overlay boundary 316N according to comparisons of RTD measurements to MIN_RTD. The overlay carriers, as supplied by the third base station 114, also now define a third maximum overlay coverage area bounded by a third maximum overlay boundary 316X according to comparisons of RTD measurements to MAX_RTD.

The effective overlay boundary 120, first illustrated in FIG. 1, may now be understood to be defined by a minimum ratio of pilot channel power to interference power threshold.

Figure 4:
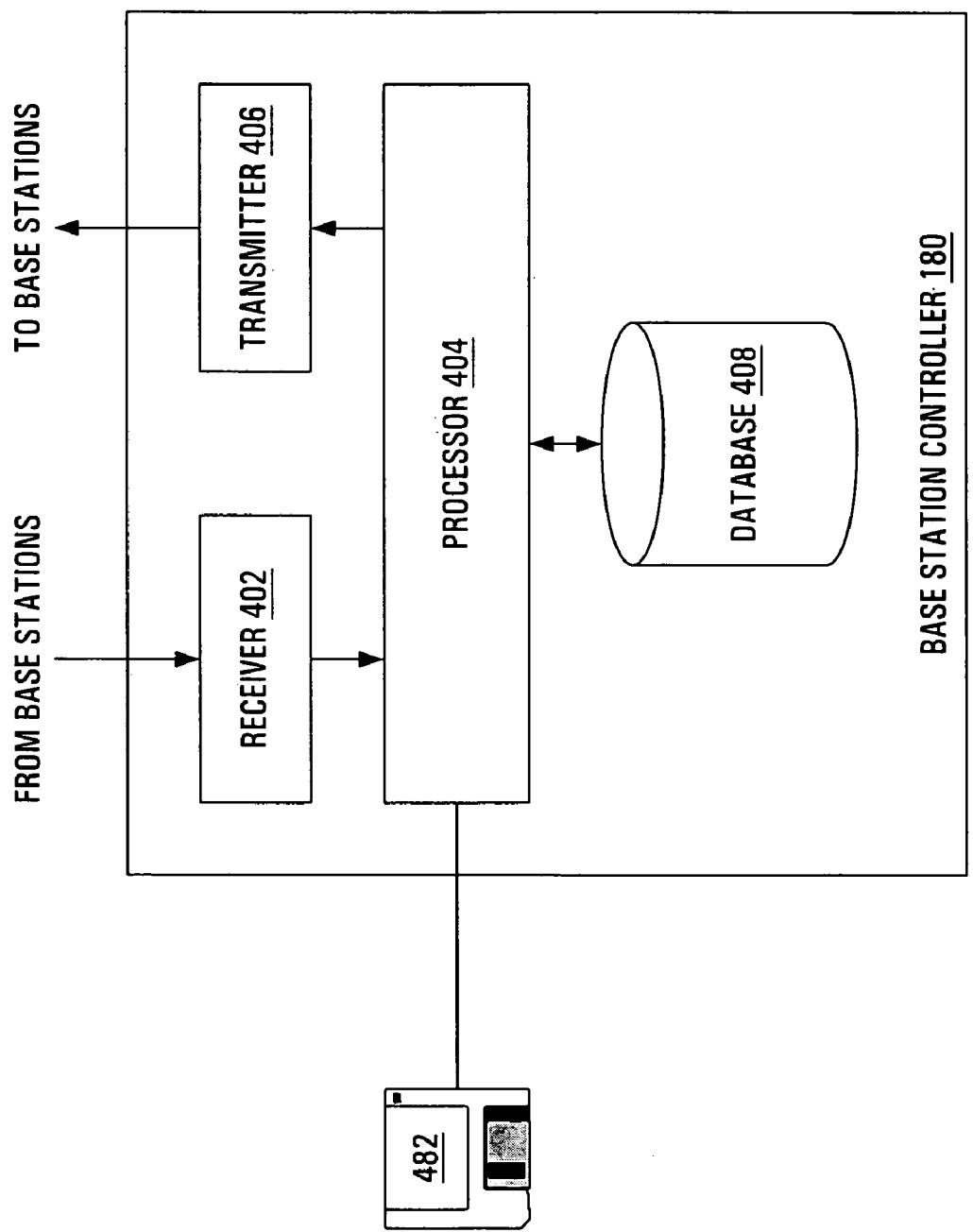
FIG. 4 illustrates a base station controller according to an embodiment of the present invention.

An exemplary structure for the base station controller 180 is illustrated in FIG. 4.

As illustrated, the base station controller 180 includes a receiver 402, for receiving information from the base stations 102, 106, 114, a processor 404 for determining whether to initiate, at the mobile station 122, a hard handoff from an overlay carrier to an underlying carrier and a transmitter 406, for transmitting a message to initiate a hard handoff at a mobile station to the base stations. The base station controller 180 may also include a database 408, whose purpose will become clear below.

The processor 404 may be loaded with computer executable instructions for executing methods exemplary of the present invention from a computer readable medium 482, which could be a disk, a tape, a chip or a random access memory containing a file downloaded from a remote source.

Figure 5:
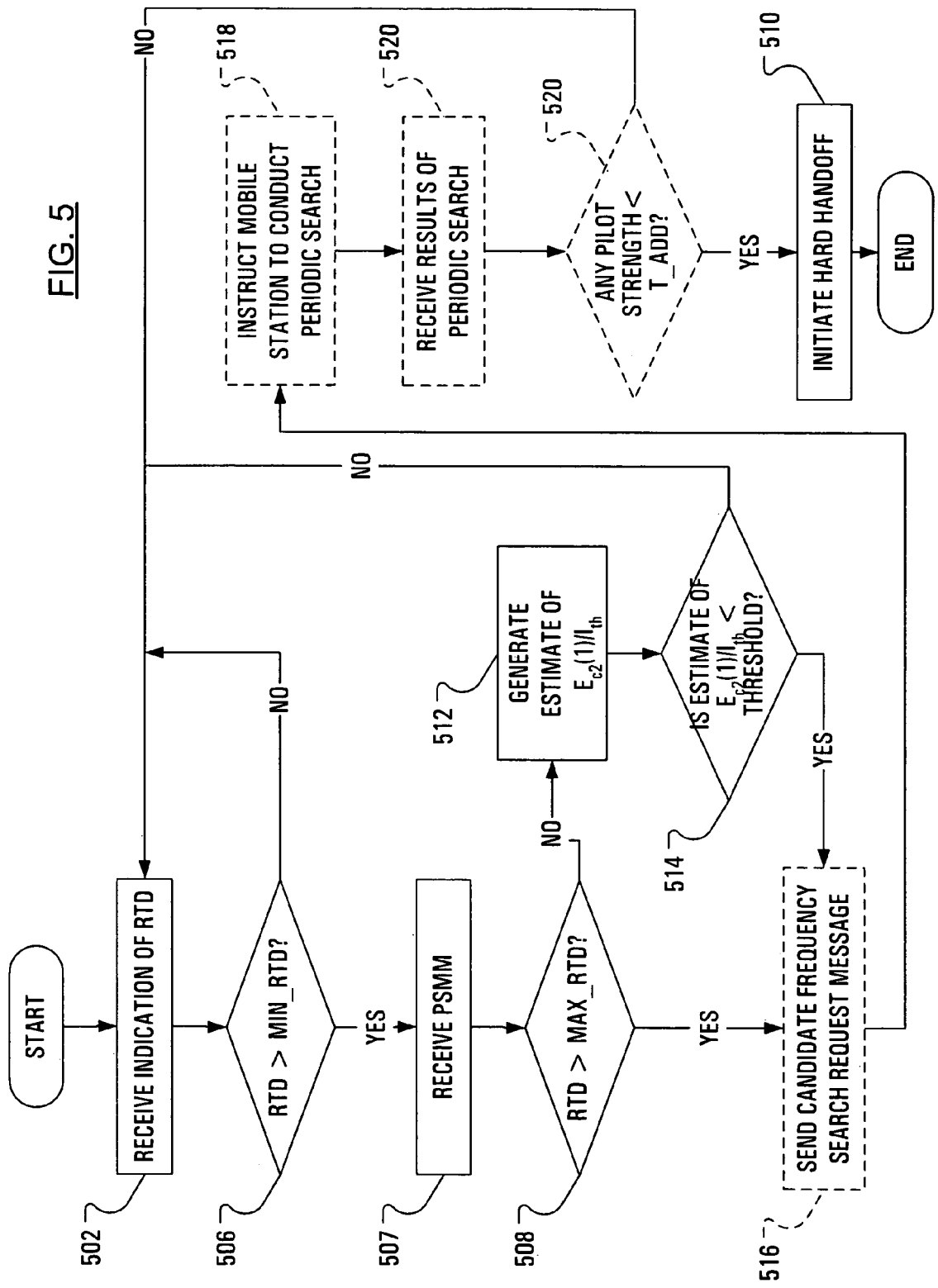
FIG. 5 illustrates steps in a method executed to determine whether to initiate, at a mobile station, a hard handoff from an overlay carrier to an underlying carrier according to an embodiment of the present invention.

The base station controller 180 may execute a method embodying an aspect of the present invention by carrying out the steps of, for example, the method of FIG. 5 to determine whether to initiate, at the mobile station 122, a hard handoff from an overlay carrier to an underlying carrier.

Initially, the base station controller 180 may receive (step 502), at the receiver 402 from the second base station 106, an indication of the RTD specific to the mobile station 122 and the second base station 106. The base station controller 180 may then compare the received RTD to the minimum RTD threshold (MIN_RTD) (step 506). If it is determined that the received RTD is less than MIN_RTD, no further actions are required and the base station controller 180 may await the receipt (step 502) of a subsequently measured RTD. If it is determined that the received RTD exceeds MIN_RTD, the base station controller 180 may then receive a PSMM generated at the mobile station 122 (step 507) based on the instruction from the base station controller 180.

The receipt of the PSMM may be based on a policy at the second base station 106 to send PSMMs received from the mobile station 122 to the base station controller 180 at an appropriately configured predetermined interval or based on a request for such information being transmitted from the base station controller 180 to the second base station 106. The transmission, by the second base station 106, of an indication of the RTD specific to the mobile station 122 and the second base station 106 may be event-based, i.e., the second base station 106 may send the RTD if the RTD has changed by more than a configured amount. Additionally, the frequency with which the mobile station 122 transmits PSMMs is also configurable.

The base station controller 180 may then compare the received RTD to the maximum RTD threshold (MAX_RTD) (step 508). If it is determined that the received RTD exceeds MAX_RTD, the base station controller 180 may initiate a hard handoff (step 510) at the mobile station 122 from the overlay carrier to the underlying carrier.

The initiation of hard handoff (step 510) is well known in the art and, as a consequence, will not be discussed in detail herein. However, it should be clear that the base station controller 180 may send instructions to the mobile station 122 on the overlay carrier, where the instructions specify a specific frequency (a target frequency) of the underlying carrier to which the mobile station 122 is to switch. The instructions may also specify a time for the switch and the base stations' pilots (pseudo-random sequences) in the active set on the underlying carrier. Several base stations' pilots (pseudo-random sequences) may be defined in the database 408 (FIG. 4).

When the hard handoff is triggered, a new active set of base stations may be suggested, by the base station controller 180, to the mobile station 122 for use when using the underlying carrier. Such a hard handoff may be called a Multiple Pilot Hard Handoff, or "MPHHO". For example, for each overlay carrier, a list of up to six hand-down target base stations (and/or target sectors), may be pre-loaded into a Pilot Database (PDB) at the base station controller 180. A predetermined number of, say, up to six, base stations can be selected, by the base station controller 180, for the new active set for use by the mobile station 122 when using the underlying carrier. The base stations' pilots corresponding to the current active set on the overlay carrier may be selected first. The remaining base stations may be selected based on an order in the list of base stations in the PDB.

Among the standards currently defining CDMA systems according to the Telecommunications Industry Association (TIA) and the Electronic Industries Association (EIA), two standards, IS-95B and IS-2000, may be considered to be well-known. A mobile station in an IS-95B or IS-2000 system is known to have a capability of transmitting a Candidate Frequency Search Report Message. From the Candidate Frequency Search Report Message, the base station controller 180 may obtain candidate pilot strength, $E_{c2}/I_o$, measurements for the target base stations (sectors) on the target frequency. This may be seen to provide the base station controller 180 with new information on channel conditions at the mobile station 122 in the target sectors on the underlying carrier and may be seen to provide benefits over the previous "blind" hard handoffs. In a blind hard handoff, the target active set may be based on configuration data instead of mobile measurements.

When the conditions that trigger the hard handoff from an overlay carrier to an underlying carrier are met, the base station controller 180 may send a Candidate Frequency Search Request Message to the mobile station 122 (step 516). The Candidate Frequency Search Request Message generally includes a Candidate frequency search set of base stations. The base station controller 180 may also instruct the mobile station 122 to conduct a periodic search on the underlying carrier (step 518). To perform such a search, the mobile station 122 periodically searches the Candidate frequency search set and reports the results (an $E_{c2}/I_o$ measurement for each pilot in the candidate frequency search set) to the base stations in the current active set. The base stations in the current active set may then report the received results to the base station controller 180. The base station controller 180 may receive the results (step 520) and determine whether any of the reported pilot strengths ($E_{c2}/I_o$) are above a threshold ("T_ADD"). If it is determined (step 522) that at least some of the reported pilot strengths are above T_ADD, the base stations whose pilot strengths are above T_ADD may be selected for adding to the new active set for use by the mobile station 122 while using the underlying carrier. When the base stations have been selected for adding to the active set, the base station controller 180 may specify the selected base stations while initiating a hard handoff (step 510) at the mobile station 122 from the overlay carrier to the underlying carrier.

If it is determined that all of the reported pilot strengths are below the T_ADD threshold, no further actions are required and the base station controller may await the receipt of subsequently reported RTD (step 502).

If it is determined that the received RTD is less than MAX_RTD, the base station controller 180 may then generate an estimate (step 512) of the ratio of the pilot channel power to interference power for the mobile station 122. The base station controller 180 may then compare the estimate of the ratio of the pilot channel power to interference power to the minimum ratio of pilot channel power to interference power threshold (step 514). If it is determined that the estimate of the ratio of the pilot channel power to the interference power exceeds the minimum ratio of pilot channel power to interference power threshold, no further actions are required and the base station controller 180 may await the receipt (step 502) of a subsequently measured RTD. If it is determined that the minimum ratio of pilot channel power to interference power threshold exceeds the estimate of the ratio of the pilot channel power to the interference power, the base station controller 180 may send a Candidate Frequency Search Request Message to the mobile station 122 (step 516) again.

The estimation of the ratio of the pilot channel power to the interference power for the mobile station 122 of step 512 involves compensating for base station loading so that the physical location of the trigger point is consistent. Accordingly, the estimate of the ratio of the pilot channel power to the interference power may be expressed as a ratio of $E_{c2}(1)$ to $I_{th}$, where $E_{c2}(1)$ is the power in the pilot channel received at the mobile station 122 from the reference base station measured at the receiver of the mobile station 122 and $I_{th}$ is the sum of the interference power from those base stations that are not in the active set and the thermal noise power measured at the receiver of the mobile station 122. The ratio $E_{c2}(1)/I_{th}$ may be expressed as a function of P(k), the pilot strength measurement of the $k^{th}$ base station in the active set reported by the mobile station, where P(1) represents the strength measurement of the pilot signal from the reference base station, $I_1(k)$, the total transmitted signal power from the $k^{th}$ base station in the active set measured at the $k^{th}$ base station antenna port, where $I_1(1)$ represents the total transmitted signal power from the reference base station, and $E_{c1}(k)$, the transmitted pilot channel power from the $k^{th}$ base station in the active set measured at the base station antenna port, where $E_{c1}(1)$ is the transmitted pilot channel power from the reference base station measured at the reference base station antenna port.

P(k), the pilot strength measurement of the $k^{th}$ base station in the active set reported by the mobile station is known to be related to the power in the pilot channel from the $k^{th}$ base station received at the mobile station by the following expression:

$$P(k) = \frac{E_{c2}(k)}{I_o}, \quad (1)$$

where the total power, $I_o$, may be given by $$I_o = \sum_{k=1}^{N} I_2(k) + I_{th} \quad (2)$$

and $I_2(k)$ represents the total signal power from the $k^{th}$ base station in the active set measured at the mobile receiver.

Inverting the pilot strength measurement of the reference base station reported by the mobile station, $$\frac{1}{P(1)} = \frac{I_o}{E_{c2}(1)}, \quad (3)$$

provides for an expansion of the numerator, $$\frac{1}{P(1)} = \frac{I_{th}}{E_{c2}(1)} + \frac{\sum_{k=1}^{N} I_2(k)}{E_{c2}(1)}, \quad (4)$$

which may be rearranged to provide an expression for the inverse of the ratio $E_{c2}(1)/I_{th}$, which is sought, $$\frac{I_{th}}{E_{c2}(1)} = \frac{1}{P(1)} - \sum_{k=1}^{N} \frac{I_2(k)}{E_{c2}(1)}. \quad (5)$$

The inverse of the first term on the right side of equation (5) is provided to the base station controller 180 in a PSMM. However, more algebra is required to determine an expression for the second term on the right side of equation (5).

Path loss is a term used to indicate a weakening, or attenuation, of a radio signal over its path of travel (say, from a base station to a mobile station) due to, for example, refraction, reflection and absorption caused by various factors such as terrain, obstructions and environmental conditions. Path loss, PL(k), for a signal received at a particular mobile station from the $k^{th}$ base station may be determined as $$PL(k) = \frac{E_{c1}(k)}{E_{c2}(k)} = \frac{I_1(k)}{I_2(k)}. \quad (6)$$

Accordingly, $I_2(k)$ and $E_{c2}(k)$ may be restated as $$I_2(k) = \frac{I_1(k)}{PL(k)} \text{ and} \quad (7)$$

$$I_2(k) = \frac{I_1(k)}{PL(k)}. \quad (8)$$

Consequently, the second term on the right side of equation (5) may be expressed as $$\frac{I_2(k)}{E_{c2}(1)} = \frac{I_1(k)}{PL(k)} \frac{PL(1)}{E_{c1}(1)} \quad (9)$$

$$= \frac{I_1(k)}{E_{c1}(1)} \frac{PL(1)}{PL(k)}.$$

Before determining an expression for ratio of the path loss on the path from the reference base station to the path loss on the path from the $k^{th}$ base station, it is worth noting that the expression for pilot strength measurement may be expressed in terms of transmitted pilot channel power, $E_{c1}(k)$, path loss, $PL(k)$, and total power received, $I_o$, as $$P(k) = \frac{E_{cI}(k)}{PL(k)I_o}, \quad (10)$$

which may be solved for path loss as follows $$PL(k) = \frac{E_{cI}(k)}{P(k)I_o}. \quad (11)$$

The ratio of the path loss on the path from the reference base station to the path loss on the path from the $k^{th}$ base station may be expressed as $$\frac{PL(1)}{PL(k)} = \frac{P(k)}{P(1)} \frac{E_{cI}(1)}{E_{cI}(k)} \quad (12)$$

and may be inserted into the equation for $$\frac{I_2(k)}{E_{c2}(1)}$$

to give $$\frac{I_2(k)}{E_{c2}(1)} = \frac{I_1(k)}{E_{cI}(1)} \frac{P(k)}{P(1)} \frac{E_{cI}(1)}{E_{cI}(k)} \quad (13)$$

$$= \frac{I_1(k)}{E_{cI}(k)} \frac{P(k)}{P(1)}.$$

Returning to equation (5), the second term on the right side may be expressed in terms of values that are known at the base station, $$\frac{I_{th}}{E_{c2}(1)} = \frac{1}{P(1)} - \sum_{k=1}^{N} \frac{I_1(k)}{E_{cI}(k)} \frac{P(k)}{P(1)} \quad (14)$$

$$= \frac{1}{P(1)}\left(1 - \sum_{k=1}^{N} \frac{I_1(k)}{E_{cI}(k)} P(k)\right).$$

The base station controller 180, when performing the steps of the method of FIG. 5, and in particular, the estimation step (step 512), may determine the inverse of the ratio $E_{c2}(1)/I_{th}$ using equation (14) with the $P(k)$ values reported by the mobile station 122 and $I_1(k)$ and $E_{c1}(k)$ values reported from the kth base station in the active set. Once the inverse of the ratio has been determined, the inverse of the ratio may be converted to decibels before comparison to a threshold (in step 514), also expressed in decibels, i.e., $$10\log\frac{I_{th}}{E_{c2}(1)} = -10\log\frac{E_{c2}(1)}{I_{th}}. \quad (15)$$

Figure 6:
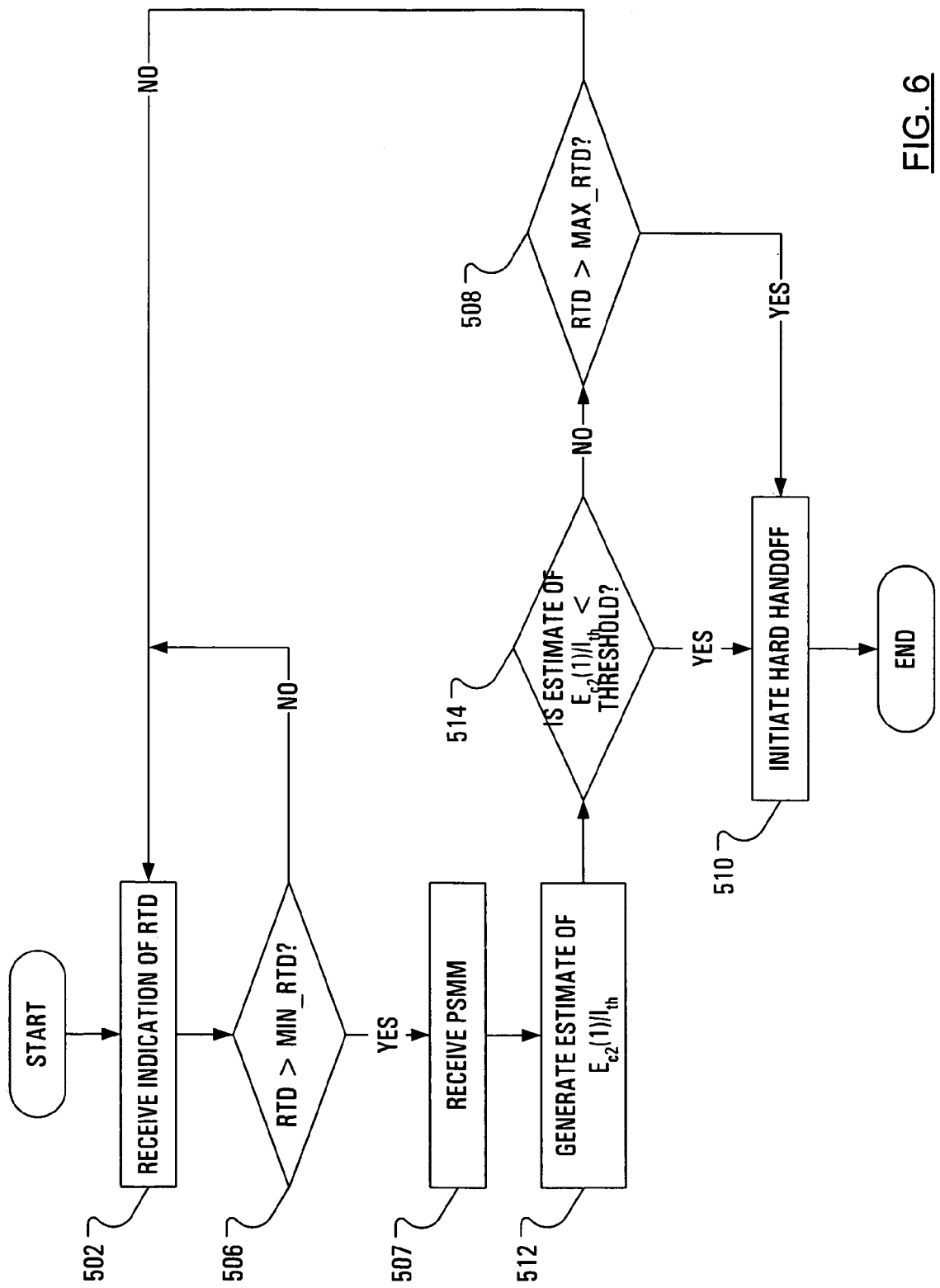
FIG. 6 illustrates steps in a further method executed to determine whether to initiate, at a mobile station, a hard handoff from an overlay carrier to an underlying carrier according to an embodiment of the present invention.

Notably, the order of the comparison of the received RTD to the maximum RTD threshold (MAX_RTD) (step 508) and the generation of an estimate (step 512) of the ratio of the pilot channel power to the interference power, and subsequent comparison of the estimate of the ratio of the pilot channel power to the interference power to the minimum ratio of the pilot channel power to the interference power ratio threshold (step 514), may be reversed, as illustrated in FIG. 6.

In the reverse-order method of FIG. 6, the base station controller 180 may receive (step 502), from the second base station 106, an indication of the RTD specific to the mobile station 122 and the second base station 106. The base station controller 180 may then compare the received RTD to the minimum RTD threshold (MIN_RTD) (step 506). If it is determined that the received RTD is less than MIN_RTD, no further actions are required and the base station controller 180 may await the receipt (step 502) of a subsequently measured RTD. If it is determined that the received RTD exceeds MIN_RTD, the base station controller 180 may then receive a PSMM generated at the mobile station 122 (step 507).

The base station controller 180 may then generate an estimate (step 512) of the ratio of the pilot channel power to the interference power for the mobile station 122. The base station controller 180 may then compare the estimate of the ratio of the pilot channel power to interference power to the minimum ratio of pilot channel power to interference power threshold (step 514).

If it is determined that the minimum ratio of pilot channel power to interference power threshold exceeds the estimate of the ratio of the pilot channel power to the interference power, the base station controller 180 may initiate a hard handoff (step 510) at the mobile station 122 from the overlay carrier to the underlying carrier.

If it is determined that the estimate of the ratio of the pilot channel power to the interference power exceeds the minimum ratio of pilot channel power to interference power threshold, the base station controller 180 may compare the received RTD to the maximum RTD threshold (MAX_RTD) (step 508). If it is determined that the received RTD exceeds MAX_RTD, the base station controller 180 may initiate a hard handoff (step 510) at the mobile station 122 from the overlay carrier to the underlying carrier. If it is determined that the received RTD is less than MAX_RTD, no further actions are required and the base station controller 180 may await the receipt (step 502) of a subsequently measured RTD.

Figure 7:
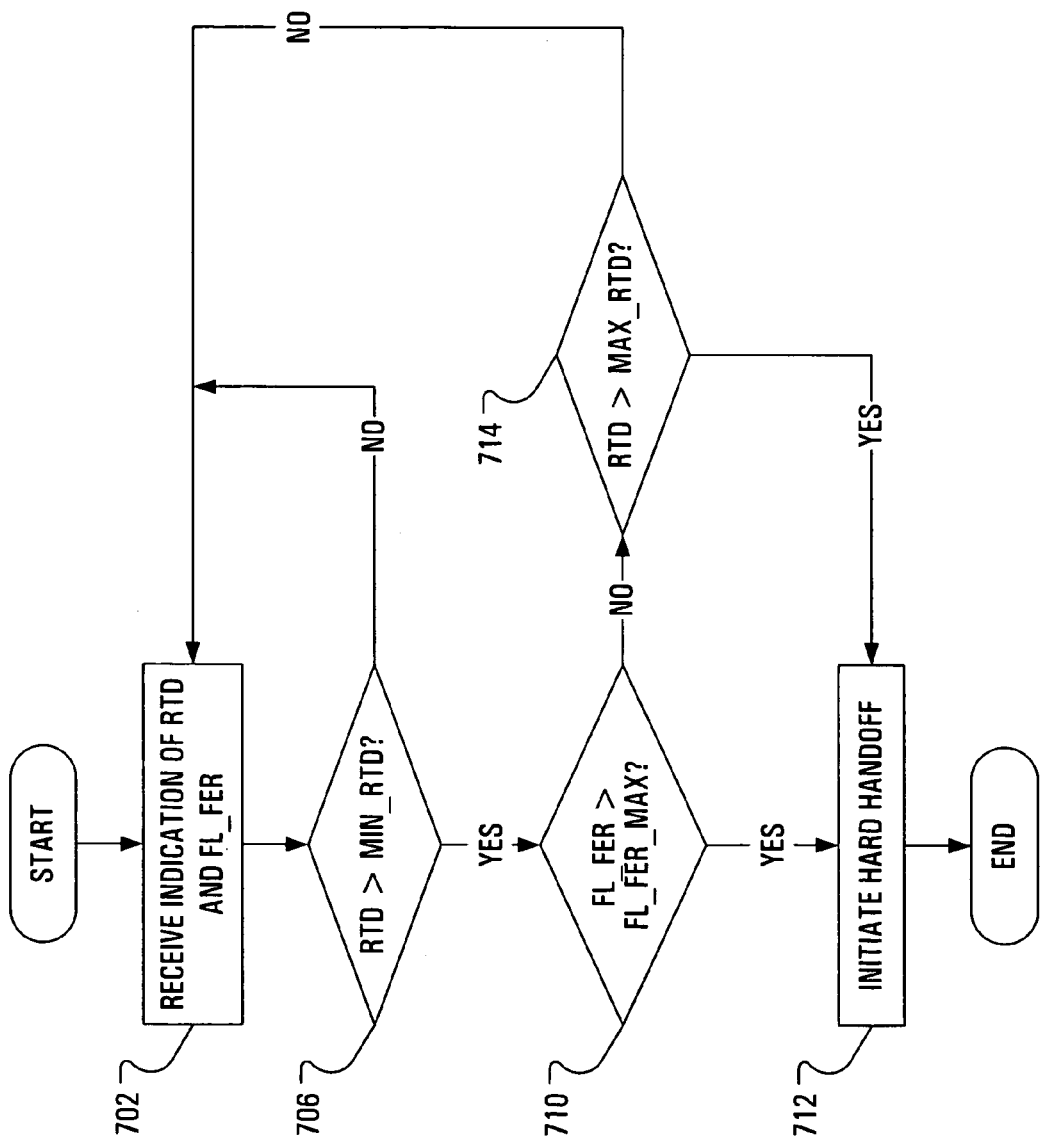
FIG. 7 illustrates steps in a still further method executed to determine whether to initiate, at a mobile station, a hard handoff from an overlay carrier to an underlying carrier according to an embodiment of the present invention.

Turning to a further alternative method for determining whether to initiate hard handoff illustrated in FIG. 7, a further alternative metric is introduced as FL_FER, which is an indication of Forward Link Traffic Frame Error Rate. The FL_FER is measured by the mobile station 122 and reported to the reference base station. In particular, the mobile station may determine the number of frames received in error as a percentage of the total number of frames received. The reference base station may then provide the FL_FER for the mobile station 122 to the base station controller 180.

In the further alternative method of FIG. 7, the base station controller 180 may receive (step 702), from the second base station 106, an indication of the FL_FER as measured by the mobile station 122 and an indication of the RTD specific to the mobile station 122 and the second base station 106. The base station controller 180 may then compare the received RTD to the minimum RTD threshold (MIN_RTD) (step 706). If it is determined that the received RTD is less than MIN_RTD, no further actions are required and the base station controller 180 may await the receipt (step 702) of a subsequently measured RTD and FL_FER. If it is determined that the received RTD exceeds MIN_RTD, the base station controller 180 may then compare the received FL_FER to a maximum FL_FER threshold (FL_FER_MAX) (step 710).

If it is determined that the received FL_FER exceeds FL_FER_MAX, the base station controller 180 may initiate a hard handoff (step 712) at the mobile station 122 from the overlay carrier to the underlying carrier.

If it is determined that the received FL_FER is less than FL_FER_MAX, the base station controller 180 may compare the received RTD to the maximum RTD threshold (MAX_RTD) (step 714). If it is determined that the received RTD exceeds MAX_RTD, the base station controller 180 may initiate a hard handoff (step 712) at the mobile station 122 from the overlay carrier to the underlying carrier. If it is determined that the received RTD is less than MAX_RTD, no further actions are required and the base station controller 180 may await the receipt (step 702) of a subsequently measured RTD and FL_FER.

Figure 8:
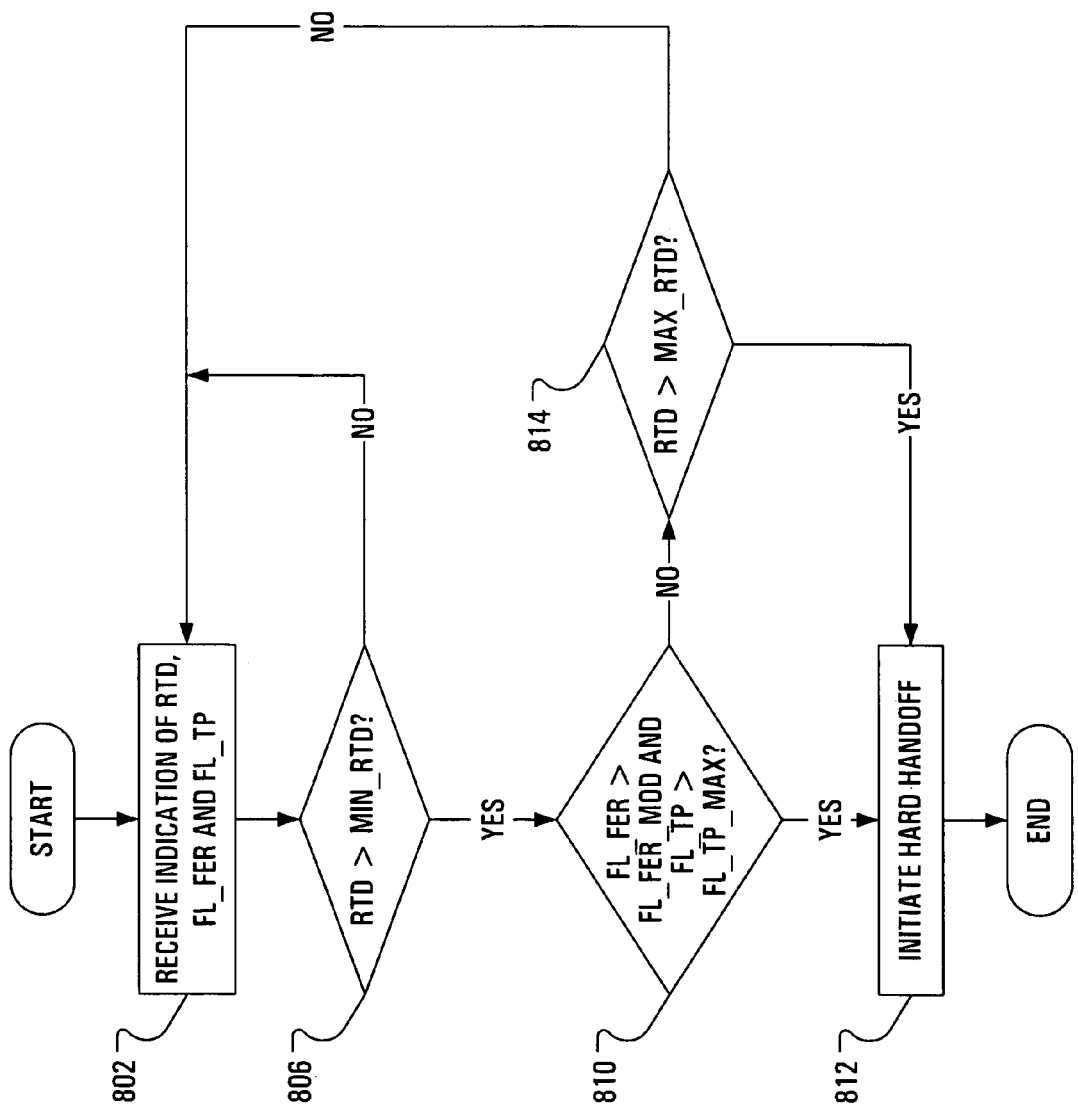
FIG. 8 illustrates steps in an even further method executed to determine whether to initiate, at a mobile station, a hard handoff from an overlay carrier to an underlying carrier according to an embodiment of the present invention.

In a still further alternative method for determining whether to initiate hard handoff illustrated in FIG. 8, a still further alternative metric is introduced as FL_TP, which is an indication of Forward Link Transmit Power. The FL_TP for the mobile station 122 is determined by the base station and reported to the base station controller 180.

In the still further alternative method of FIG. 8, the base station controller 180 may receive (step 802), from the second base station 106, an indication of the FL_FER as measured by the mobile station 122, an indication of the FL_TP as determined by the second base station 106 and an indication of the RTD specific to the mobile station 122 and the second base station 106. The base station controller 180 may then compare the received RTD to the minimum RTD threshold (MIN_RTD) (step 806). If it is determined that the received RTD is less than MIN_RTD, no further actions are required and the base station controller 180 may await the receipt (step 802) of a subsequently measured RTD, FL_FER and FL_TP. If it is determined that the received RTD exceeds MIN_RTD, the base station controller 180 may then compare the received FL_FER to a moderate FL_FER threshold (FL_FER_MOD) and may also compare the received FL_TP to a maximum FL_TP threshold (FL_TP_MAX) (step 810).

If it is determined that the received FL_FER exceeds FL_FER_MOD and the received FL_TP exceeds FL_TP_MAX, the base station controller 180 may initiate a hard handoff (step 812) at the mobile station 122 from the overlay carrier to the underlying carrier.

If it is determined that either the received FL_FER is less than FL_FER_MOD or the received FL_TP is less than FL_TP_MAX, the base station controller 180 may compare the received RTD to the maximum RTD threshold (MAX_RTD) (step 814). If it is determined that the received RTD exceeds MAX_RTD, the base station controller 180 may initiate a hard handoff (step 812) at the mobile station 122 from the overlay carrier to the underlying carrier. If it is determined that the received RTD is less than MAX_RTD, no further actions are required and the base station controller 180 may await the receipt (step 802) of a subsequently measured RTD, FL_FER and FL_TP.

Figure 9:
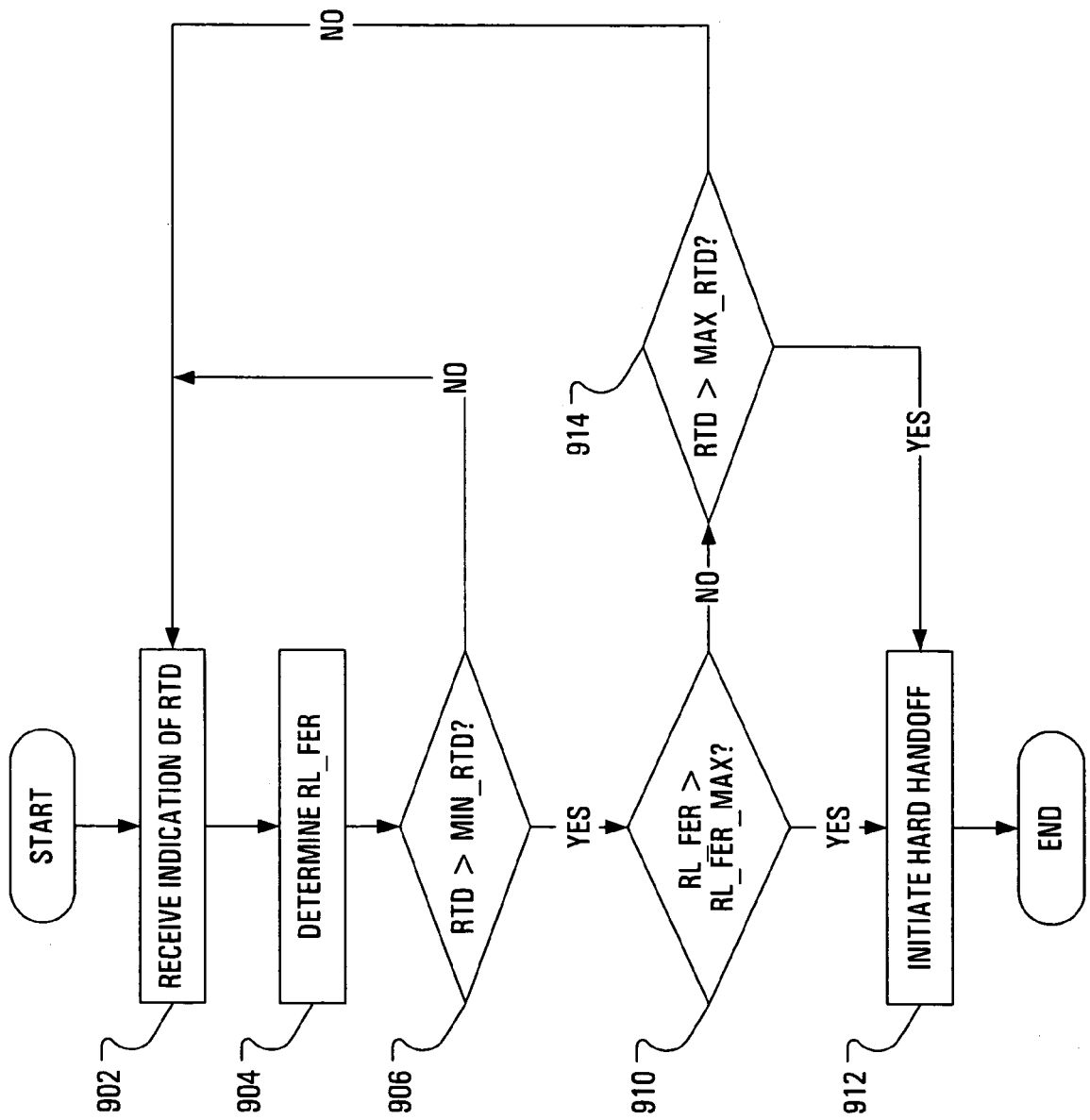
FIG. 9 illustrates steps in an alternative method executed to determine whether to initiate, at a mobile station, a hard handoff from an overlay carrier to an underlying carrier according to an embodiment of the present invention.

In an even further alternative method for determining whether to initiate hard handoff illustrated in FIG. 9, an even further alternative metric is introduced as RL_FER, which is an indication of Reverse Link Traffic Frame Error Rate. A total frame count and an error frame count may be determined by the base station controller 180 associated with the mobile station 122. From the total frame count and an error frame count, the base station controller 180 may determine the RL_FER.

In the even further alternative method of FIG. 8, the base station controller 180 may receive (step 902), from the second base station 106, an indication of the RTD specific to the mobile station 122 and the second base station 106. The base station controller 180 may then determine the RL_FER based on frame counts (step 904) and compare the received RTD to the minimum RTD threshold (MIN_RTD) (step 906). If it is determined that the received RTD is less than MIN_RTD, no further actions are required and the base station controller 180 may await the receipt (step 902) of a subsequently measured RTD. If it is determined that the received RTD exceeds MIN_RTD, the base station controller 180 may then compare the determined RL_FER to a maximum RL_FER threshold (RL_FER_MAX) (step 910).

If it is determined that the determined RL_FER exceeds RL_FER_MAX, the base station controller 180 may initiate a hard handoff (step 912) at the mobile station 122 from an overlay carrier to an underlying carrier.

If it is determined that the determined RL_FER is less than RL_FER_MAX, the base station controller 180 may compare the received RTD to the maximum RTD threshold (MAX_RTD) (step 914). If it is determined that the received RTD exceeds MAX_RTD, the base station controller 180 may initiate a hard handoff (step 912) at the mobile station 122 from an overlay carrier to an underlying carrier. If it is determined that the received RTD is less than MAX_RTD, no further actions are required and the base station controller 180 may await the receipt (step 902) of a subsequently measured RTD.

Figure 10:
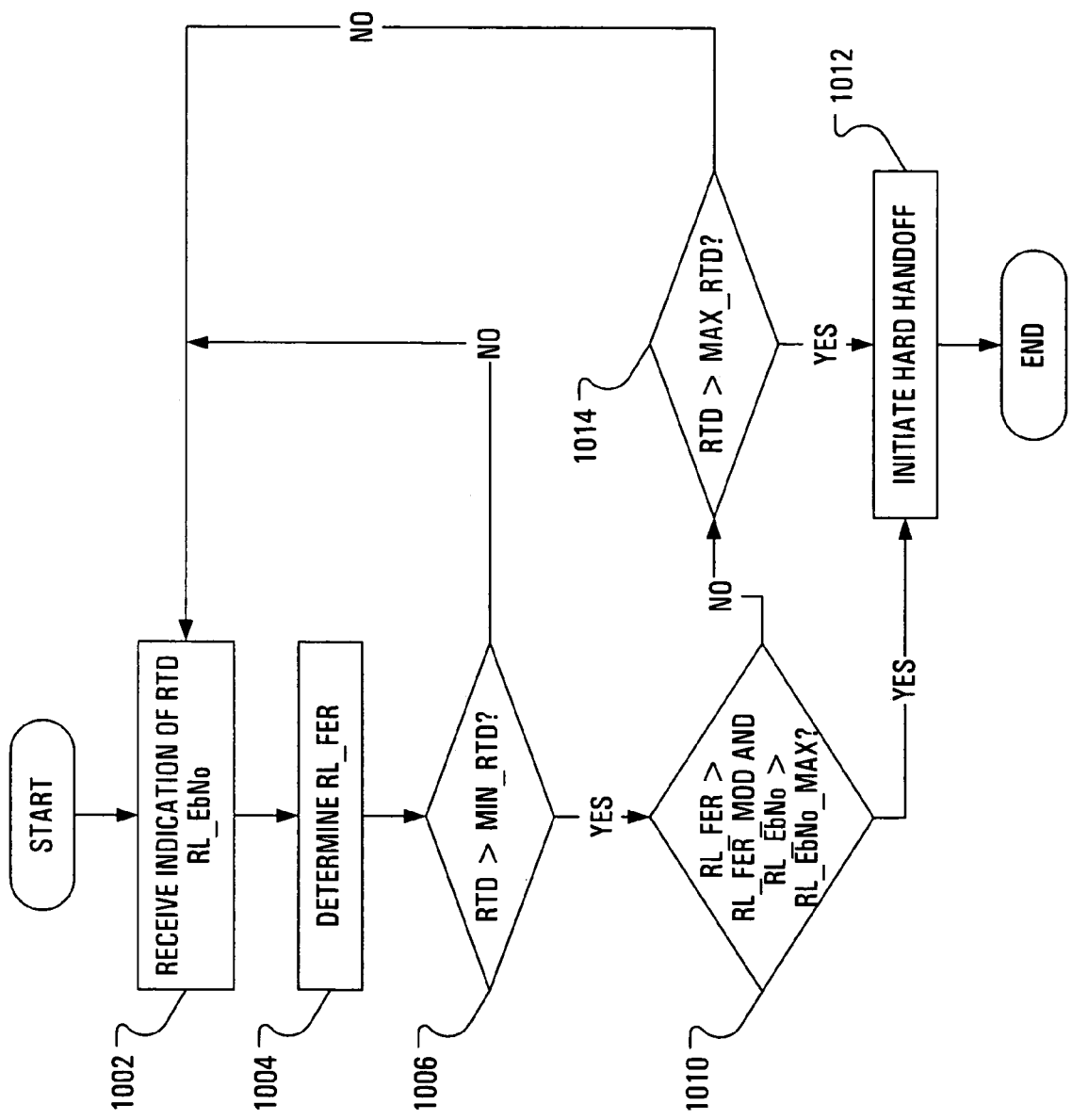
FIG. 10 illustrates steps in a further alternative method executed to determine whether to initiate, at a mobile station, a hard handoff from an overlay carrier to an underlying carrier according to an embodiment of the present invention.

In an even still further alternative method for determining whether to initiate hard handoff illustrated in FIG. 10, an even still further alternative metric is introduced as RL_EbNo, which is an indication of a Reverse Link power control metric known as a ratio of energy per beat to noise power ($E_b/N_o$) setpoint. The RL_EbNo for the mobile station 122 is determined by the reference base station and reported to the base station controller 180.

In the even still further alternative method of FIG. 10, the base station controller 180 may receive (step 1002), from the second base station 106, an indication of the RL_EbNo as measured by the second base station 106, an indication of the RTD specific to the mobile station 122 and the second base station 106. The base station controller 180 may then determine a value for RL_FER based on frame counts (step 1004). The base station controller 180 may then compare the received RTD to the minimum RTD threshold (MIN_RTD) (step 1006). If it is determined that the received RTD is less than MIN_RTD, no further actions are required and the base station controller 180 may await the receipt (step 1002) of a subsequently measured RTD, RL_EbNo. If it is determined that the received RTD exceeds MIN_RTD, the base station controller 180 may then compare the determined RL_FER to a moderate RL_FER threshold (RL_FER_MOD) and may also compare the received RL_EbNo to a maximum RL_EbNo threshold (RL_EbNo_MAX) (step 1010).

If it is determined that the determined RL_FER exceeds RL_FER_MOD and the received RL_EbNo exceeds RL_EbNo_MAX, the base station controller 180 may initiate a hard handoff (step 1012) at the mobile station 122 from the overlay carrier to an underlying carrier.

If it is determined that either the determined RL_FER is less than RL_FER_MOD or the received RL_EbNo is less than RL_EbNo_MAX, the base station controller 180 may compare the received RTD to the maximum RTD threshold (MAX_RTD) (step 1014). If it is determined that the received RTD exceeds MAX_RTD, the base station controller 180 may initiate a hard handoff (step 1012) at the mobile station 122 from the overlay carrier to the underlying carrier. If it is determined that the received RTD is less than MAX_RTD, no further actions are required and the base station controller 180 may await the receipt (step 1002) of a subsequently measured RTD, RL_EbNo.

Figure 11:
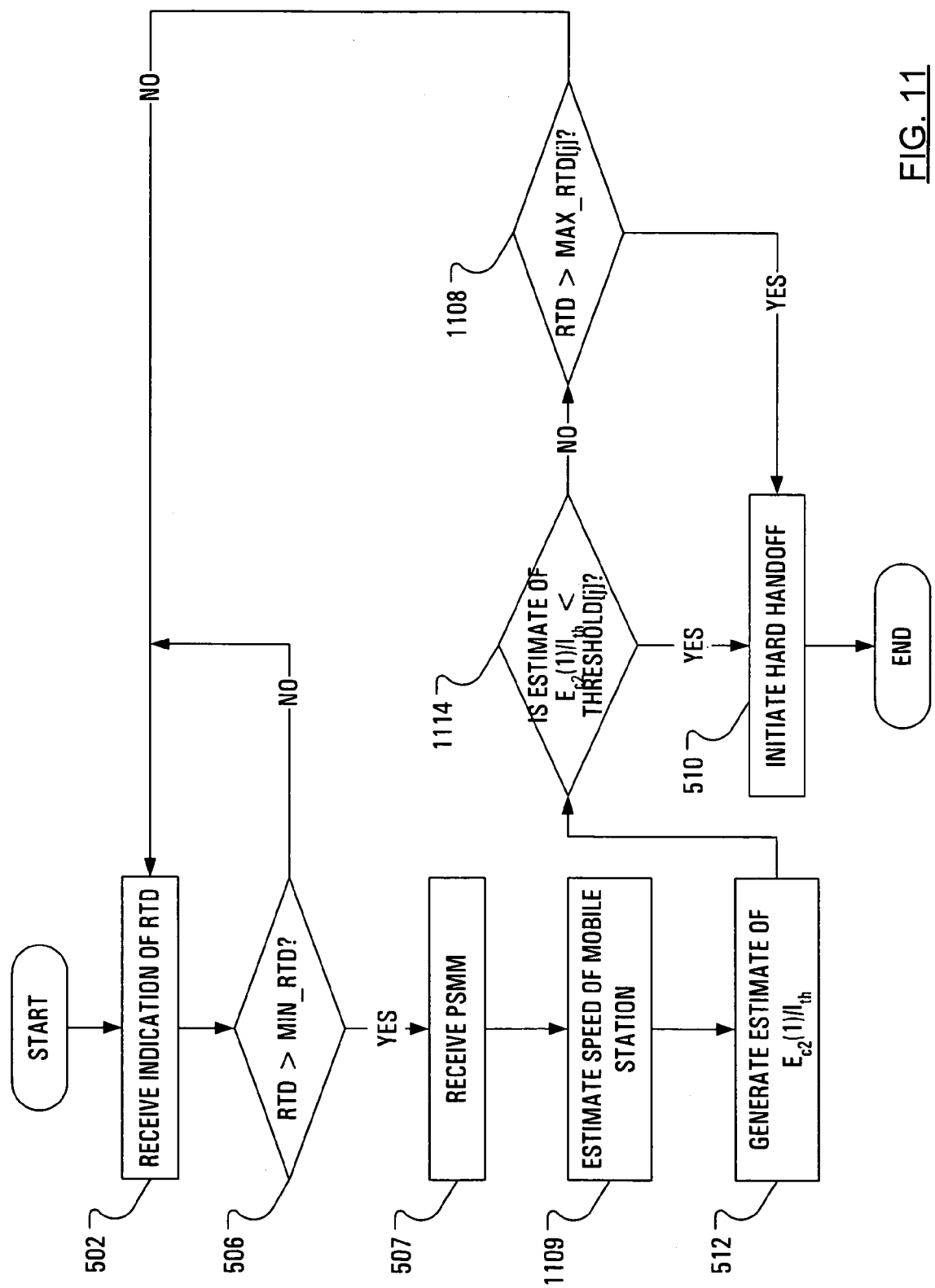
FIG. 11 illustrates an even further alternative method executed to determine whether to initiate, at a mobile station, a hard handoff from an overlay carrier to an underlying carrier according to an embodiment of the present invention.

In FIG. 11, method steps are illustrated for an adaptation of the reverse-order method of FIG. 6, wherein like steps have been given like reference numbers. Initially, the base station controller 180 may receive (step 502), from the second base station 106, an indication of the RTD specific to the mobile station 122 and the second base station 106. The base station controller 180 may then compare the received RTD to MIN_RTD (step 506). If it is determined that the received RTD is less than MIN_RTD, no further actions are required and the base station controller 180 may await the receipt (step 502) of a subsequently measured RTD. If it is determined that the received RTD exceeds MIN_RTD, the base station controller 180 may then receive a PSMM generated at the mobile station 122 (step 507).

The base station controller 180 may then estimate the speed of the mobile station 122 (step 1109). The estimate of the speed of the mobile station may allow the determination of a mobile speed index. The mobile speed index may then be used to select a threshold for subsequent threshold comparison steps. The mobile speed index may be rather coarse, e.g., a mobile speed index of 1 may indicate a high speed, a mobile speed index of 2 may indicate a medium speed and a mobile speed index of 3 may indicate a slow speed.

Estimation of the speed of the mobile station 122 (step 1109) may be accomplished through analysis of two successive RTD measurements. In particular, where each RTD measurement is associated with a time stamp, the difference in time stamps for the two successive RTD measurements may be determined as a time delta. The difference between the values of the two successive RTD measurements may be divided by two to give a half-difference related to a unidirectional signal path. The half-difference may be multiplied by the speed of light to arrive at a distance traveled by the mobile station 122 between the two successive RTD measurements. The distance traveled may then be divided by the time delta to give an estimate of the speed of the mobile station 122.

The base station controller 180 may then generate an estimate (step 512) of the ratio of the pilot channel power to the interference power for the mobile station 122. The base station controller 180 may then compare the estimate of the ratio of the pilot channel power to the interference power to the appropriately indexed minimum ratio of pilot channel power to interference power threshold called THRESHOLD [j], j=1, 2, J (step 1114). THRESHOLD[1] for a high speed mobile station may be greater than THRESHOLD[2] for a medium speed mobile station, which, in turn, may be greater than THRESHOLD[3] for a slow speed mobile station (J=3).

If it is determined that the appropriately indexed minimum ratio of pilot channel power to interference power threshold exceeds the estimate of the ratio of the pilot channel power to interference power, the base station controller 180 may initiate a hard handoff (step 510) at the mobile station 122 from the overlay carrier to the underlying carrier.

If it is determined that the estimate of the ratio of the pilot channel power to the interference power exceeds the minimum ratio of pilot channel power to interference power threshold, the base station controller 180 may compare the received RTD to an appropriately indexed maximum RTD threshold (MAX_RTD[j]) (step 1108). MAX_RTD[1] for a high speed mobile station may be less than MAX_RTD[2] for a medium speed mobile station, which, in turn, may be less than MAX_RTD[3] for a slow speed mobile station. If it is determined that the received RTD exceeds MAX_RTD [j], the base station controller 180 may initiate a hard handoff (step 510) at the mobile station 122 from the overlay carrier to the underlying carrier. If it is determined that the received RTD is less than MAX_RTD[j], no further actions are required and the base station controller 180 may await the receipt (step 502) of a subsequently measured RTD.

Notably, in each of the methods represented in FIGS. 7, 8, 9, 10 and 11, the order of the comparison of one or more metrics to corresponding thresholds (steps 710, 810, 910, 1010, 1114) and the comparison of the received RTD to the MAX_RTD threshold (steps 714, 814, 914, 1014, 1108) may be reversed in the same way that the order of steps 512 and 514 relative to step 508 between the methods of FIG. 6 and FIG. 5.

Additionally, one or more of the steps in which one or more metrics is compared to a corresponding threshold (steps 514, 710, 810, 910, 1010, 1114) may be amalgamated such that if any of the conditions that would individually trigger a hard handoff are satisfied, a hard handoff may be initiated.

Figure 12:
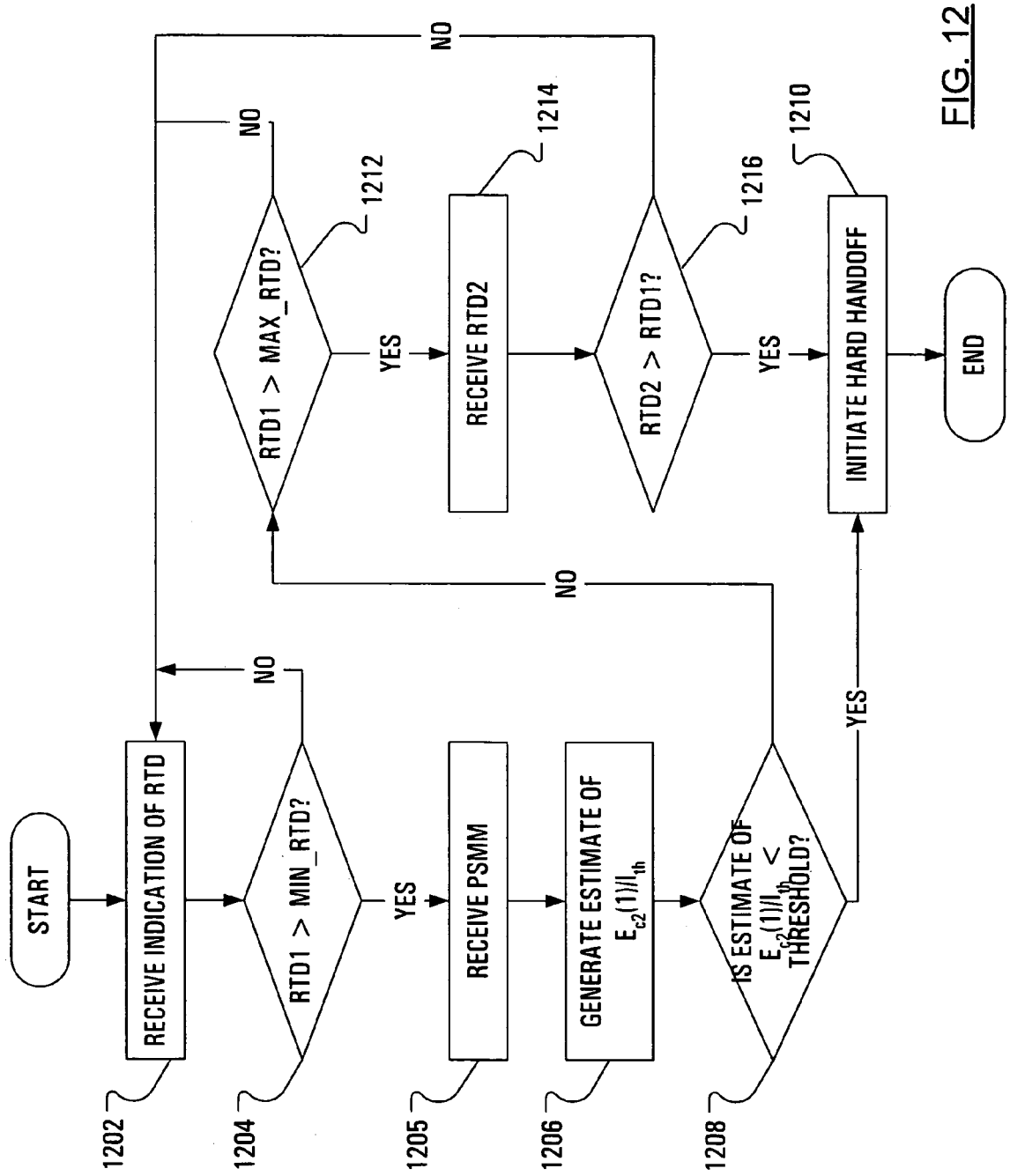
FIG. 12 illustrates steps in a further method executed to determine whether to initiate, at a mobile station, a hard handoff from an overlay carrier to an underlying carrier according to an embodiment of the present invention.

In the method of FIG. 12, the base station controller 180 may receive (step 1202), from the second base station 106, an indication of a first RTD specific to the mobile station 122 and the second base station 106. The base station controller 180 may then compare the first RTD to the minimum RTD threshold (MIN_RTD) (step 1204). If it is determined that the first RTD is less than MIN_RTD, no further actions are required and the base station controller 180 may await the receipt (step 1202) of a subsequently measured RTD. If it is determined that the received RTD exceeds MIN_RTD, the base station controller 180 may then receive a PSMM generated at the mobile station 122 (step 1205).

The base station controller 180 may then generate an estimate (step 1206) of the ratio of the pilot channel power to the interference power for the mobile station 122. The base station controller 180 may then compare the estimate of the ratio of the pilot channel power to the interference power to the minimum ratio of pilot channel power to interference power threshold (step 1208).

If it is determined that the minimum ratio of pilot channel power to interference power threshold exceeds the estimate of the ratio of the pilot channel power to interference power, the base station controller 180 may initiate a hard handoff (step 1210) at the mobile station 122 from the overlay carrier to the underlying carrier.

If it is determined that the estimate of the ratio of the pilot channel power to interference power exceeds the minimum ratio of pilot channel power to interference power threshold, the base station controller 180 may compare the first RTD to the maximum RTD threshold (MAX_RTD) (step 1212). If it is determined that the first RTD exceeds MAX_RTD, the base station controller 180 may await the may receipt (step 1214), from the second base station 106, of an indication of a second RTD specific to the mobile station 122 and the second base station 106.

The base station controller 180 may then compare the first RTD to the second RTD (step 1216). If it is determined that the first RTD exceeds the second RTD, it may be considered that the mobile station 122 is approaching the second base station 106. As such, the base station controller 180 may await the receipt (step 1202) of a subsequently measured RTD.

If it is determined that the second RTD exceeds the first RTD, it may be considered that the mobile station 122 is moving away from the second base station 106. As such, the base station controller 180 may initiate a hard handoff (step 1210) at the mobile station 122 from the overlay carrier to the underlying carrier.

If it is determined (in step 1212) that the received RTD is less than MAX_RTD, no further actions are required and the base station controller 180 may await the receipt (step 1202) of a subsequently measured RTD.

A mobile station in a IS-95B or IS-2000 system is known to have a capability of transmitting a periodic pilot strength measurement message (PPSMM) that includes indications of both $E_{c2}(k)/I_o$ and $I_o$ measurements for each base station k in the active set. As a result, the power in the pilot channel received at the mobile station 122 from the reference base station, $E_{c2}(1)$, can be determined as follows:

$$10\log[E_{c2}(1)] = 10\log\left[\frac{E_{c2}(1)}{I_o}\right] + 10\log[I_o]. \quad (16)$$

Advantageously, an estimate of the power in the pilot channel received at the mobile station 122 from the reference base station, $E_{c2}(1)$, is independent of the total power, $I_o$, received the mobile station 122. Consequently, the estimate of the received power in the reference base station pilot channel has in common with the estimate of the ratio of the pilot channel power to the interference power an independence from loading. The estimate of the received power in the reference base station pilot channel may be used as the metrics for triggering the hard handoff.

The meaning of the estimate of the received power in the reference base station pilot channel may be enhanced through an association with the power used at the reference base station to transmit the pilot channel. As such, a further alternative metric for comparing against a threshold to determine whether to initiate a hard handoff at the mobile station 122 from an overlay carrier to an underlying carrier may be given as $$\frac{E_{c2}(1)}{E_{cI}(1)}.$$

Notably, the metric given by $$\frac{E_{c2}(1)}{E_{cI}(1)}$$

may be considered to indicate a path loss between the base station and the mobile station 122. Furthermore, it should be noted that this determination is not possible in a system operating according to the IS-95A standard.

In the method of FIG. 13, the base station controller 180 may receive (step 1302), from the second base station 106, an indication of the RTD specific to the mobile station 122 and the second base station 106. The base station controller 180 may then compare the received RTD to the minimum RTD threshold (MIN_RTD) (step 1304). If it is determined that the received RTD is less than MIN_RTD, no further actions are required and the base station controller 180 may await the receipt (step 1302) of a subsequently measured RTD. If it is determined that the received RTD exceeds MIN_RTD, the base station controller 180 may receive a PPSMM generated at the mobile station 122 (step 1305).

The base station controller 180 may then compare the received RTD to the maximum RTD threshold (MAX_RTD) (step 1306). If it is determined that the received RTD exceeds MAX_RTD, the base station controller 180 may initiate a hard handoff (step 1308) at the mobile station 122 from the overlay carrier to the underlying carrier. If it is determined that the received RTD is less than MAX_RTD, the base station controller 180 may then generate an estimate (step 1310), e.g., from equation (16), of the power in the reference base station pilot channel received at the mobile station 122. The base station controller 180 may then compare the estimate of the received power in the reference base station pilot channel to the minimum received power threshold (step 1312).

If it is determined that the minimum received power threshold exceeds the estimate of the received power in the reference base station pilot channel, the base station controller 180 may initiate a hard handoff (step 1308) at the mobile station 122 from the overlay carrier to the underlying carrier. If it is determined that estimate of the received power in the reference base station pilot channel exceeds the minimum received power threshold, no further actions are required and the base station controller 180 may await the receipt (step 1302) of a subsequently measured RTD.

It should be clear that, the term "base station" has been used herein where it may be considered just as common to refer to a sector, rather than a base station.

Advantageously, by triggering hard handoff based on mobile and/or base station measured RTD in conjunction with an estimate of the ratio of the pilot channel power to the interference power, base station loading may be compensated for, such that the physical location of the trigger point based on the ratio of the pilot channel power to the interference power is consistent. The thresholds for both the RTD and the estimate of the ratio of the pilot channel power to the interference power may be individually configured and may be independently enabled or disabled on a per carrier-sector basis.

Further advantageously, a degree of user mobility may be identified to bias against prematurely performing a hard handoff of a low mobility mobile station to a carrier from an underlying base station.

Although the illustrated example embodiments of aspects of this invention described in the preceding sections use omni base stations, it should be clear to a person of ordinary skill in the art that aspects of the present invention can also be used for known sectored base station configurations.

Other modifications will be apparent to those skilled in the art and, therefore, the invention is defined in the claims.

We claim:

1. A method of initiating a hard handoff at a mobile station from an overlay carrier to an underlying carrier in a wireless telecommunications system, said method comprising:
   receiving an indication of a value of a primary metric;
   receiving indications of values for a plurality of secondary metrics;
   comparing said value of said primary metric to a predetermined primary threshold;
   if said value of said primary metric exceeds said predetermined primary threshold, determining an estimate for a value of a tertiary metric, based on said values for said plurality of secondary metrics;

comparing said estimate for said value of said tertiary metric to a predetermined tertiary threshold; and initiating said hard handoff at said mobile station if said estimate for said value of said tertiary metric is less than said tertiary threshold.

2. The method of claim 1 wherein said primary metric is a round trip delay, where said round trip delay is a time required for a message to perform a return trip between said mobile station and a base station supplying said overlay carrier, and said primary threshold is a minimum round trip delay.

3. The method of claim 1 wherein said tertiary metric is a ratio of power in a pilot channel received at said mobile station from said base station supplying said overlay carrier to power in interference signals received at said mobile station from base stations not identified in an active set of base stations and said tertiary threshold is a lower limit for said ratio.

4. The method of claim 3 further comprising:

determining a speed estimate for said mobile station; and selecting said lower limit based on said speed estimate.

5. The method of claim 4 further comprising selecting said lower limit such that a first lower limit selected based on a first speed estimate exceeds a second lower limit selected based on a second speed estimate where said first speed estimate exceeds said second speed estimate.

6. The method of claim 3 wherein said plurality of secondary metrics comprises a ratio, associated with each base station in said active set of base stations, of power in a pilot channel received from said each base station measured at said mobile station to a total power received by said mobile station.

7. The method of claim 3 wherein said plurality of secondary metrics comprises a total transmitted signal power from each base station in said active set of base stations measured at an antenna port of said each base station.

8. The method of claim 3 wherein said plurality of secondary metrics comprises an indication of transmitted pilot channel power from each base station in said active set of base stations measured at an antenna port of said each base station.

9. The method of claim 1 wherein said tertiary metric is a forward link frame error rate and said tertiary threshold is a maximum forward link frame error rate.

10. The method of claim 1 wherein said tertiary metric is a reverse link frame error rate, said tertiary threshold is a maximum reverse link frame error rate.

11. The method of claim 1 wherein said primary metric is a round trip delay, where said round trip delay is a time required for a message to perform a return trip between said mobile station and said base station supplying said overlay carrier, and said primary threshold is minimum round trip delay, wherein said plurality of secondary metrics includes:

a ratio, $P(k)$, associated with each base station in said active set of base stations, of power in a pilot channel received from said each base station measured at said mobile station to a total power received by said mobile station;

a total transmitted signal power, $I_1(k)$, from each base station in said active set of base stations measured at an antenna port of said each base station; and an indication of transmitted pilot channel power, $E_{c1}(k)$, from each base station in said active set of base stations measured at an antenna port of said each base station;

wherein said tertiary metric is an estimate of a ratio of power in a pilot channel received at said mobile station from said base station supplying said overlay carrier, $E_{c2}(1)$, to power in interference signals received at said mobile station from base stations not identified in an active set of base stations, $I_{th}$, said estimate is determined from:

$$\frac{E_{c2}(1)}{I_{th}} = \frac{1}{\frac{1}{P(1)} - \sum_{k=1}^{N} \frac{I_1(k)}{E_{c1}(k)} \frac{P(k)}{P(1)}}; \text{ and}$$

said tertiary threshold is a lower limit for said ratio.

12. The method of claim 1 wherein said tertiary metric is a power received at said mobile station from said base station supplying said overlay carrier and said tertiary threshold is a lower limit for said power.

13. The method of claim 12 wherein said plurality of secondary metrics comprises:

an indication of a value for a ratio of pilot channel power received at said mobile station from said base station supplying said overlay carrier to a total power received by said mobile station; and an indication of a value for said total power received by said mobile station.

14. The method of claim 1 wherein said tertiary metric is a ratio of a power received at said mobile station from said base station supplying said overlay carrier to a power transmitted from said base station supplying said overlay carrier and said tertiary threshold is a lower limit for said ratio.

15. A base station controller in a wireless telecommunications system comprising:

means for receiving an indication of a value of a primary metric and indications of values for a plurality of secondary metrics;

means for determining an estimate for a value of a tertiary metric, based on said values for said plurality of secondary metrics;

means for comparing said value of said primary metric to a predetermined primary threshold and for comparing said estimate for said value of said tertiary metric to a predetermined tertiary threshold; and means for transmitting a message to initiate a hard handoff at a mobile station from an overlay carrier to an underlying carrier if said estimate for said value of said tertiary metric is less than said tertiary threshold.

16. A method of initiating a hard handoff at a mobile station from an overlay carrier to an underlying carrier in a wireless telecommunications system, said method comprising:

receiving an indication of a value of a primary metric;

receiving an indication of a value of a secondary metric;

receiving an indication of a value of a tertiary metric; and comparing said value of said primary metric to a predetermined primary threshold;

if said value of said primary metric exceeds said predetermined primary threshold:

comparing said value of said secondary metric to a predetermined secondary threshold; and comparing said value of said tertiary metric to a predetermined tertiary threshold;

initiating said hard handoff at said mobile station if:

said value of said secondary metric exceeds said secondary threshold; and said value of said tertiary metric exceeds said tertiary threshold.

17. The method of claim 16 wherein said primary metric is a round trip delay, where said round trip delay is a time required for a message to perform a return trip between said mobile station and a base station supplying said overlay carrier, and said primary threshold is a minimum round trip delay.

18. The method of claim 16 wherein said secondary metric is forward link frame error rate and said secondary threshold is a moderate forward link frame error rate.

19. The method of claim 16 wherein said tertiary metric is a reverse link traffic power and said tertiary threshold is a maximum reverse link traffic power.

20. The method of claim 16 wherein said secondary metric is reverse link frame error rate and said secondary threshold is a moderate reverse link frame error rate.

21. The method of claim 16 wherein said tertiary metric is a reverse link power control setpoint and said tertiary threshold is a maximum reverse link power control setpoint.

* * * * *